(12) United States Patent
Grassl et al.

(10) Patent No.: US 9,905,896 B2
(45) Date of Patent: Feb. 27, 2018

(54) ROTARY SWITCH FOR LOW PASSIVE INTERMODULATION CONNECTION

(71) Applicant: SPINNER GmbH, Munich (DE)

(72) Inventors: Martin Grassl, Erding (DE); Georg Hupfauer, Westerham (DE)

(73) Assignee: SPINNER GmbH, Munich (DE)

( * ) Notice: Subject to any disclaimer, the term of this patent is extended or adjusted under 35 U.S.C. 154(b) by 0 days.

(21) Appl. No.: 15/656,316

(22) Filed: Jul. 21, 2017

(65) Prior Publication Data

US 2017/0324133 A1    Nov. 9, 2017

Related U.S. Application Data

(63) Continuation-in-part of application No. PCT/EP2016/051025, filed on Jan. 19, 2016.

(30) Foreign Application Priority Data

Jan. 23, 2015  (EP) ..................... 15152379

(51) Int. Cl.
  *H01P 1/12*      (2006.01)
  *H01H 53/02*    (2006.01)
  *H01H 1/36*     (2006.01)

(52) U.S. Cl.
  CPC ............. *H01P 1/125* (2013.01); *H01H 53/02* (2013.01)

(58) Field of Classification Search
  CPC ................ H01P 1/10; H01P 1/12; H01H 1/36
  USPC ................................................ 333/105, 262
  See application file for complete search history.

(56) References Cited

U.S. PATENT DOCUMENTS

| 2,409,617 | A |   | 10/1946 | Elliot et al. |
| 2,439,255 | A |   | 4/1948  | Longfellow |
| 2,477,635 | A |   | 8/1949  | Marchand |
| 2,749,524 | A |   | 6/1956  | Derosa et al. |
| 4,408,253 | A |   | 10/1983 | Nishino et al. |
| 4,920,324 | A | * | 4/1990  | Whittaker ............... H01P 1/125 |
|           |   |   |         |   200/600 |
| 4,967,174 | A |   | 10/1990 | Yee et al. |
| 5,121,089 | A | * | 6/1992  | Larson ................. H01H 1/0036 |
|           |   |   |         |   200/181 |
| 5,281,936 | A | * | 1/1994  | Ciezarek ................. H01P 1/125 |
|           |   |   |         |   333/103 |
| 5,557,495 | A |   | 9/1996  | Belcher et al. |
| 9,763,503 | B2 | * | 9/2017  | Selvi ........................ A45C 5/14 |

FOREIGN PATENT DOCUMENTS

| CN | 203352554 U | 12/2013 |
| DE | 1616102     | 3/1969  |
| DE | 1916102     | 3/1969  |
| GB | 845404      | 8/1960  |
| GB | 2187599 A   | 9/1987  |

* cited by examiner

*Primary Examiner* — Dean Takaoka
(74) *Attorney, Agent, or Firm* — Yakov S. Sidorin; Quarles & Brady LLP (57) ABSTRACT

A low passive intermodulation (PIM) RF rotary switch comprises a plurality of center conductors connected to stationary pads, at least two rotatable pads being connected by a rotatable pad bridge. Depending on the switching state of the switch, at least two stationary pads are in close proximity to at least two rotatable pads, at a distance sufficient to generate/form a RF signal connection between the center conductors via the stationary and rotatable pads.

16 Claims, 9 Drawing Sheets

ROTARY SWITCH FOR LOW PASSIVE INTERMODULATION CONNECTION

CROSS-REFERENCE TO RELATED APPLICATIONS

This application is a continuation from pending International Application No. PCT/EP2016/051025 filed on Jan. 19, 2016, which designates the United States and claims priority from the European Application No. 15152379.2 filed on Jan. 23, 2015. The disclosure of each of the above-identified applications is incorporated herein by reference.

BACKGROUND

1. Field of the Invention

The invention relates to a low passive intermodulation radio frequency rotary switch for use in switching coaxial lines. Such switches may be used in test equipment, which preferably is used for intermodulation measurement.

2. Description of Relevant Art

For performing tests and measurements in RF (radio frequency) equipment, it is often required to switch individual coaxial lines.

U.S. Pat. No. 4,967,174 A discloses a rotating coaxial switch. This switch operates by lifting the switching circuitry before rotating. Such performance allows for increase of the contact force after the switching has been performed. In such switches, the passive intermodulation decreases with increasing contact force. However, there exist mechanical limits imposed on the contact force and therefore the reduction of passive intermodulation is limited as well. Furthermore, with wear of the contacts, the intermodulation increases. Accordingly, the described in U.S. Pat. No. 4,967,174A switch has a limited lifetime.

SUMMARY

The embodiments address a goal of providing an RF (Radio Frequency) switch for switching coaxial lines, which offers a very low passive intermodulation (PIM). Furthermore, the disclosed switch requires low maintenance and has an extended lifetime as compared to those of related art.

In an embodiment, a low passive intermodulation (PIM) switch includes four ports, which may be connected by switching elements in a predetermined manner. The switching elements are rotated about a rotation axis and interact with stationary coupling elements, thereby forming a capacitively coupled switch. The resulting capacitively coupled switch does not have any mechanical or galvanic contacts and, therefore, does not generate any passive intermodulation of RF signals. In an alternate embodiment, the switching elements may be moved between alternate positions, preferably with a linear movement. The basic switching function of such embodiment remains independent of the specific movement. Therefore, embodiments of switches may be based on a linear or any other kind of displacement of the pads. In the description of such embodiments provide below, all terms which are related to "rotation" or "rotatable" are intended to mean and should be more generally understood as meaning "movement" or "movable".

In one embodiment, the switch is a rotatable switch for alternatingly connecting four ports. The ports have RF connectors which, in operation, are preferably connected to any kind of test equipment, such as for example a network analyzer, a load, or any other device. It is further preferred, if the coaxial connectors are chosen to also be low PIM connectors. The coaxial connectors are connected via coaxial center conductors to at least one stationary pad for capacitively coupling an RF signal. Preferably, the center conductors comprise solid or hollow metal tubes or rods. In another embodiment, the center conductors may also be structures like striplines on a dielectric carrier (such as a printed circuit board, for example). Preferably, there are two pads connected to each center conductor. At the rotatable part, there is at least one rotatable pad interfacing with at least one stationary pad. It is further preferred to have two stationary pads, most preferably one stationary pad above a rotatable pad and the second stationary pad below or under a rotatable pad. It is further preferred, if two rotatable pads are connected by a bridge. The bridge preferably provides an electrical and mechanical connection between these pads, and most preferably is mechanically connected to a shaft to guide or rotate the bridge together with the pads. An RF signal coming from a first coaxial connector is coupled via a first center conductor to at least a first stationary pad. From the stationary pad, the signal is coupled to a rotatable pad, from which it is further guided by the bridge to a second rotatable pad to be coupled to at least one second stationary pad, and via a second center conductor to a second coaxial connector. In a first embodiment, there are four ports, each port having a coaxial connector, a center conductor, and at least one, preferably two stationary pads. A rotor has two sets of rotatable pads, whereas a first rotatable pad is coupled to a second rotatable pad via a first bridge, and a third rotatable pad is coupled to a fourth rotatable pad via a second bridge.

Although the rotatable pads may rotate continuously, there are certain positions where at least one rotatable pad overlaps with at least one stationary pad, and preferably overlaps in a centered manner, such that the overlapping surface/area is maximized. At maximum degree of overlap, there is the highest coupling capacitance, and therefore the best coupling between the stationary and the rotatable pads. In the above embodiment (having four ports with four stationary pads and four rotatable pads) there are four discrete positions with maximum overlap of the pads. In a preferred embodiment, the stationary pads and the rotatable pads are arranged under angles of 90° centered around the rotation axis of the rotor. Accordingly, the four discrete positions for maximum coupling are 90° distant from each other.

In a related embodiment, at least one movable pad and/or at least one pad bridge is movable and/or displaceable. Most preferably, at least one movable pad and/or at least one pad bridge is a) displaceable parallel to a plane defined by the pad and/or b) tiltable from (with respect to) a plane defined by the pad. Preferably, a pad bridge has two ends, each end holding a movable pad.

With the use of such displacement and/or tilt, mechanical tolerances of the stationary pads may be compensated. This allows the stationary pads to be constructed from a stiff (and not elastic or springy) material forming the pad sections. A stiff material with a predefined distance of the stationary pad sections results in a precisely defined coupling capacitance between the rotatable pads and the stationary pads, further resulting in more reproducible and improved coupling characteristics. Furthermore, the gap (distance) between the stationary pad sections can be minimized, such that the movable parts fit in between precisely, resulting in a significantly improved coupling capacitance. The remaining gap between two stationary pad sections and a movable pad in between may be in a range of 0.5 mm to 0.005 most preferably between 0.05 mm and 0.1 mm.

It is further preferred to have a symmetrical arrangement of the stationary pads and to have symmetrical arrangement of the two sets of rotatable pads, as each set has two pads connected by a bridge. The switch of this specific embodiment has the following states:

| state | port 1 | port 2 | port 3 | port 4 |
|---|---|---|---|---|
| 1 | X | X | Y | Y |
| 2 | Y | X | X | Y |
| 3 | Y | Y | X | X |
| 4 | X | Y | Y | X |

The marks X in this table refer to a connection of the ports by means of the first set of rotatable pads, while the marks Y relate to connection of the ports by the second set of rotatable pads.

In a preferred embodiment, there is at least one ridge of conductive material between adjacent stationary pads. Such a ridge may be at the bottom and/or at the top of the housing. The ridge increases isolation between the stationary pads and therefore between the ports.

Preferably, the movable pads have an arcuately shaped outer contour, which may be limited by a common circle for all movable pads. This way, the movable pads are configured to rotate in close proximity (that is, at a separation distance sufficient to cause a capacitive coupling between the corresponding components and/or to form an RF signal connection between them) to an inner contour (which may be straight or arc shaped) of the stationary pads, which further increases coupling capacitance.

In a further embodiment, at least one movable pad bridge (which may be the first and/or second pad bridge) is narrower than the least one movable pad. This may result in lower capacitance to ground as the ridges are closer to the bridge than the sidewalls.

Although a described-above embodiment may be preferred, there may be any other number of ports and/or pads at the rotatable part.

It is further preferred to have a drive means which may be a motor, preferably a stepping motor or a solenoid, which may further be coupled by means of a gear to the rotatable part. It is further preferred to have a position sensor to indicate the region of certain discrete coupling positions and/or to indicate which coupling position has been reached. There may also be a position indicator which indicates either the individual positions and/or the switching state of the switch. Basically, a switch as mentioned above having four ports has two switching states, as the states 1 and 3 as well as 2 and 4, as shown in the table above, connect the same ports.

In a further preferred embodiment, the shaft is made of plastic material, although it may also be made of any other non-conductive material, like ceramics. It is further preferred, if a plurality stationary pads form a gap such that the rotatable pads fit in-between with a very low air gap to obtain a maximum coupling capacity. In an alternate embodiment, a plurality of rotatable pads form a gap such that stationary pads fit in-between. In another embodiment there may be any number of rotating or stationary pads which are geared together. To avoid/prevent a galvanic contact between the rotatable and stationary pads, it is preferred to coat the pads with a specific, galvanic-contact-preventing paint (referred to as non-contacting paint), which may for example be an epoxy material. Furthermore, the pads may have an anodized isolating layer, or there may be any plastic material, like a sheet of PTFE in-between the pads.

In a preferred embodiment, each or at least one pad is in a plane orthogonal to the rotation axis. The planes of different pads may be displaced to each other for allowing the pads to move as described herein. In another embodiment, each pad may be on a circular cylinder surface centered to the rotation axis.

BRIEF DESCRIPTION OF THE DRAWINGS

In the following, the invention will be described by way of example, without limitation of the general inventive concept, on examples of embodiment and with reference to the drawings.

Various modifications and alternative forms can be introduced to the embodiments without the deviation from the scope of the invention. Specific embodiments are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
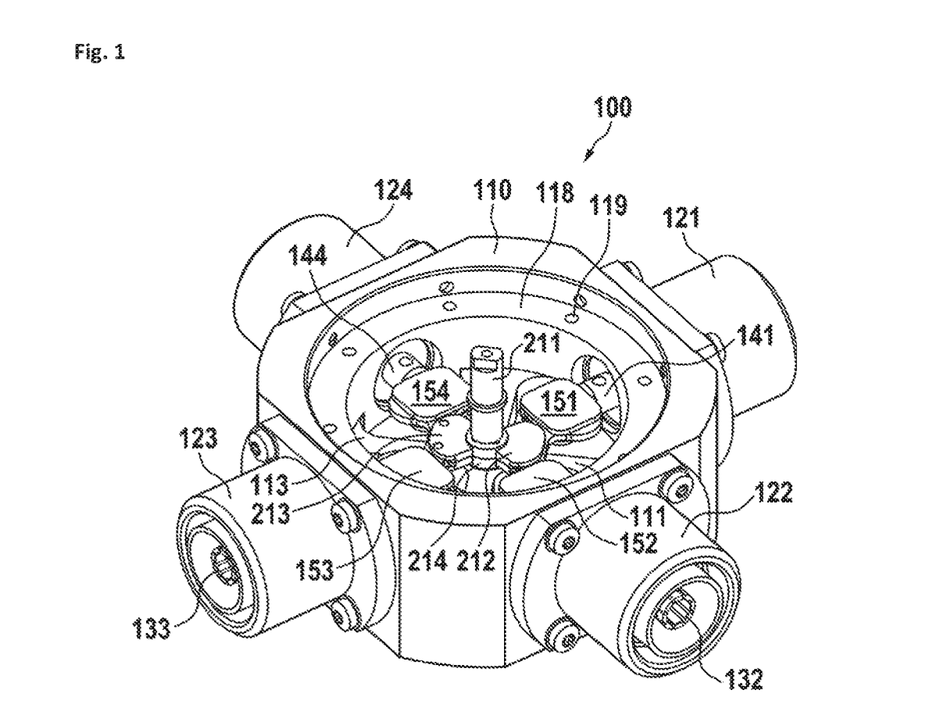
FIG. 1 shows a perspective view of a preferred embodiment.

In FIG. 1, a perspective view of a preferred embodiment of a rotary switch is shown. The basic switching function is independent of the specific movement. Therefore, switches may be based on a linear or any other kind of displacement of the pads. A rotary switch 100 comprises a housing 110 for holding and enclosing the electrical components. At the housing, there are a first coaxial connector 121, a second coaxial connector 122, a third coaxial connector 123, and a fourth coaxial connector 124. For contacting, the coaxial connectors have center conductors. The first coaxial connector has a center conductor 131 (which will be shown later), the second coaxial connector has a center conductor 132, the third coaxial connector has a center conductor 133, and the fourth coaxial connector has a center conductor 134 (which will be shown later). The center conductors of the coaxial connectors are connected to respective center conductors of the switch (141, 142, 143, and 144). At the end of the switch center conductors, there are stationary pads, whereas always one primary stationary pad section is combined with a secondary stationary pad section, forming a contact fork. A first primary stationary pad section 151 and a first secondary stationary pad section 161 are connected to the first center conductor 141. The other stationary pads (152, 162; 153, 163; 154, 164) are connected in the same way to their respectively center conductors 141, 142, 143, 144. For switching, rotatable pads, which will be shown in more detail later, are provided in-between the stationary pads, thus forming a coupling capacitance between the stationary and the rotatable pads. Details of the rotor will be shown and explained in the following Figures.

Figure 2:
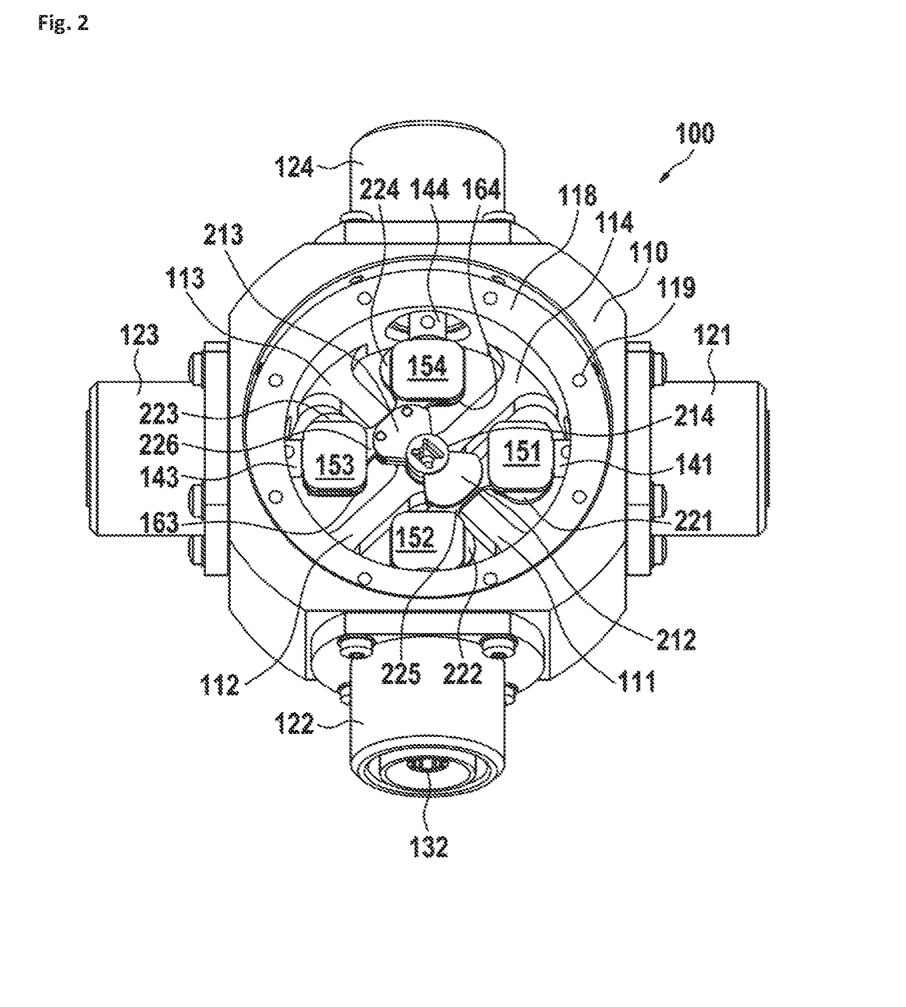
FIG. 2 shows a top view.

In FIG. 2, a top view of a first embodiment is shown. Basically, here the same components as in the previous Figure may be seen. Due to the different viewing angle, a first ridge 111, a second ridge 112, a third ridge 113, and a fourth ridge 114, all at the housing and preferably at the bottom of the housing, supporting a shaft 211 for driving the rotatable pads, are shown. Furthermore or alternatingly, the ridges may increase isolation between the stationary pads, therefore increasing isolation between the ports. There may be a recess 118 and threaded holes 119 for holding and fixing a cover and a drive motor to the unit.

Figure 3:
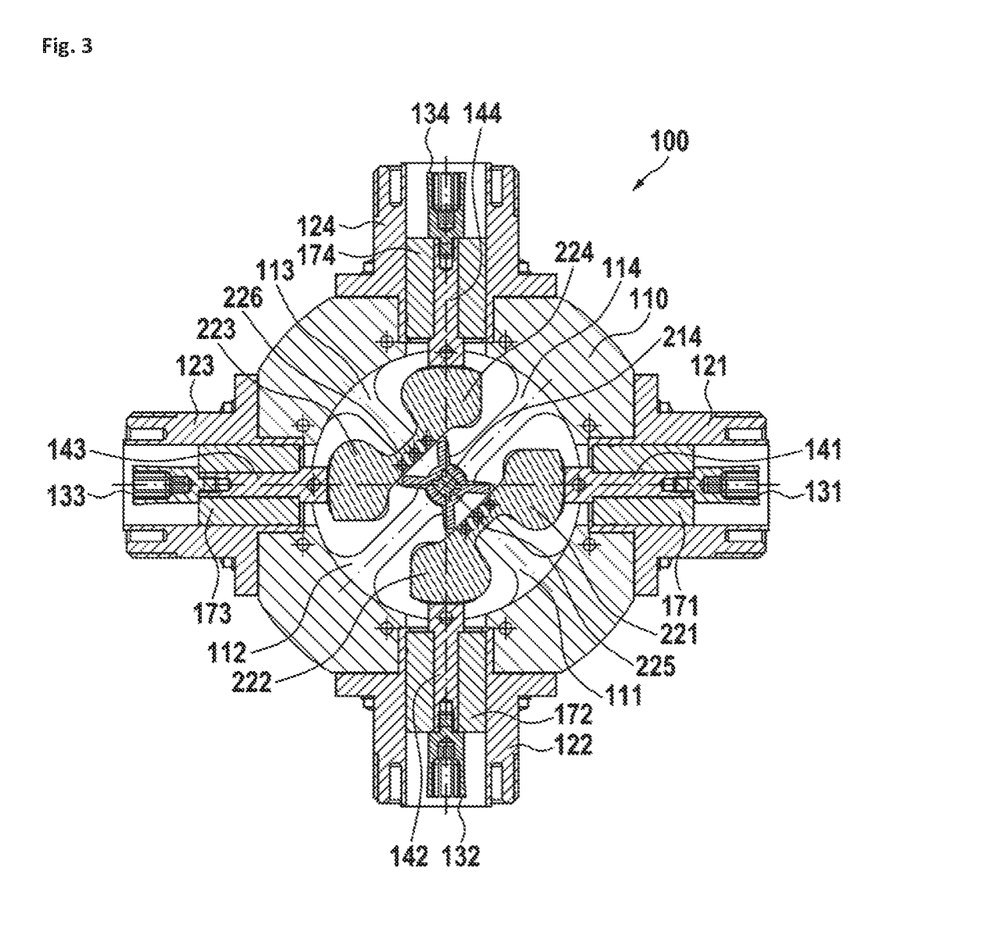
FIG. 3 shows a sectional view from the top.

In FIG. 3, a sectional view of the first embodiment is shown. It shows a cut through a plane defined by the rotatable pads. Accordingly, the rotatable pads 221, 222, 223, 224 can be seen clearly. The first rotatable pad 221 and the second rotatable pad 222 are electrically and mechanically connected by a first rotatable pad bridge 225. The third rotatable pad 223 and the fourth rotatable pad 224 are electrically and mechanically connected by the second rotatable pad bridge 226. This Figure shows further details of the coaxial connectors and the center conductors of the switch, which previously were mentioned. The center conductors are held by isolators 171, 172, 173, 174, which preferably comprise a dielectric material, like a plastic material, and most preferably like PTFE or polyethylene.

Figure 4:
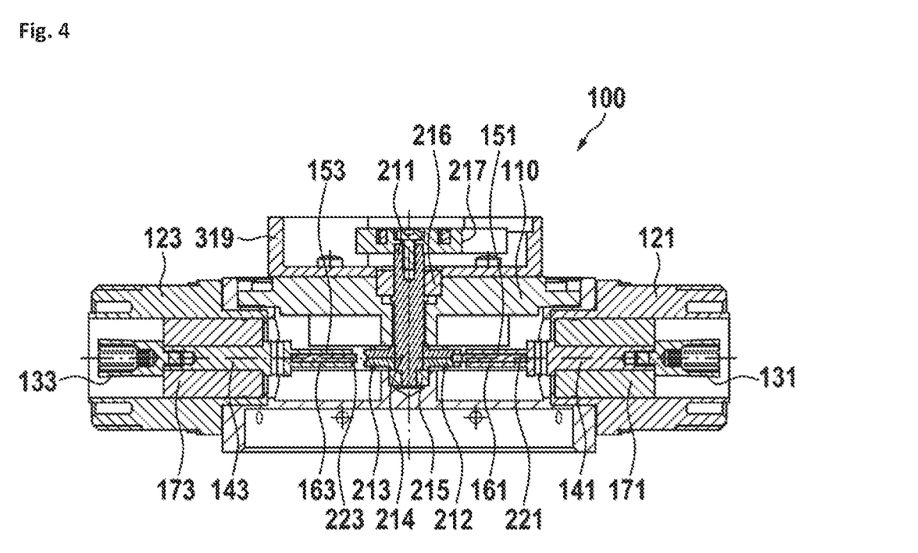
FIG. 4 shows a sectional side view.

In FIG. 4, a sectional side view in a plane going through the center of the first center conductor and the third center conductor is shown. Here, the fork-shaped arrangement of the primary stationary pad sections and secondary stationary pad sections can be seen by way of the examples of the primary stationary pad section 151 and first secondary stationary pad section 161 enclosing first rotatable pads 221. The rotatable parts are driven by a drive shaft 211, to which a first bridge holder 212 and second bridge holder 213 are attached. There may be at least one bearing, preferably a first bearing 215 at the bottom of the drive shaft, and a second bearing 216 at the top of the drive shaft. To allow easy disassembly of the unit, the drive shaft may comprise several parts. For example, there may be a drive shaft receptacle 214 comprising the lower section of the drive shaft, which is holding the bridge holders and into which an upper section of the drive shaft may be plugged or connected. Furthermore, the drive shaft may be operated by a drive lever 217.

Figure 5:
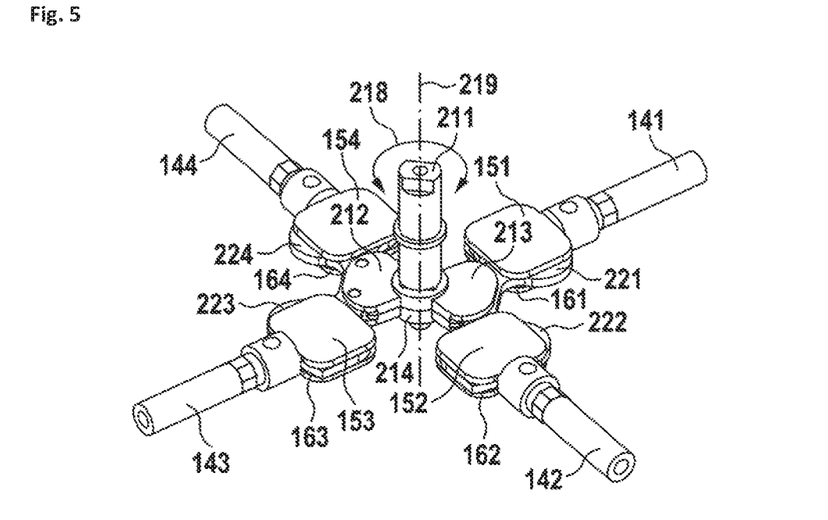
FIG. 5 shows details of the electrical components.

In FIG. 5, details of the electrical components are shown. Here, the stationary and the rotatable pads can be seen in detail. The rotatable pads may be moved by rotating the drive shaft 211, as shown by arrow 218. Although the drive shaft 211 together with the rotatable pads may be continuously rotated about 360°, it is preferred that there are discrete positions in which the rotation is stopped. Such a position is shown in this Figure, where the rotatable pads completely or almost completely overlap with the stationary pads, as this results in a maximum coupling capacitance between the rotatable and stationary pads. The drive shaft defines a rotation axis 219. The position of the drive shaft and the rotatable pads shown in here is a first switching position. In this first switching position, the first center conductor 141 is connected to the second center conductor 142 via first stationary pads 151, 161 coupled to first rotatable pad 221, further connected via first bridge holder 212 to the second rotatable pad 222, which is further capacitively coupled to second primary stationary pad section 152 and second secondary stationary pad section 162. Furthermore, third center conductor 143 is connected to fourth center conductor 144 in a similar way. When rotating the drive shaft 211 for example 90° clockwise, the second center conductor 142 is connected to third center conductor 143, and fourth center conductor 144 is connected to first center conductor 141. If the drive shaft and the rotatable pads are further rotated by 90°, again as in the first position first center conductor 141 is connected to second center conductor 142 and third center conductor 143 is connected to fourth center conductor 144. Here, only the rotatable pads and the corresponding bridges are exchanged, but the function is basically the same. The same applies if the drive shaft rotates for further 90°, which results in a connection scheme of this fourth position, which is the same as in the second position. Rotating the drive shaft by further 90° will result in the first position.

Figure 6:
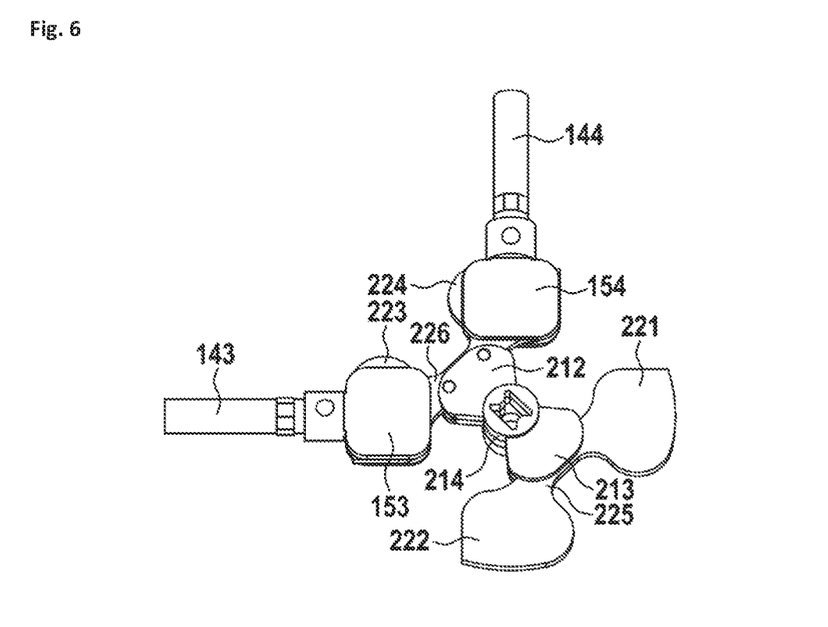
FIG. 6 shows further details of the electrical components.

In FIG. 6, further details of the electrical components can be seen, as the stationary parts, like the stationary pads 151 and 152 are removed in this Figure.

Figure 7:
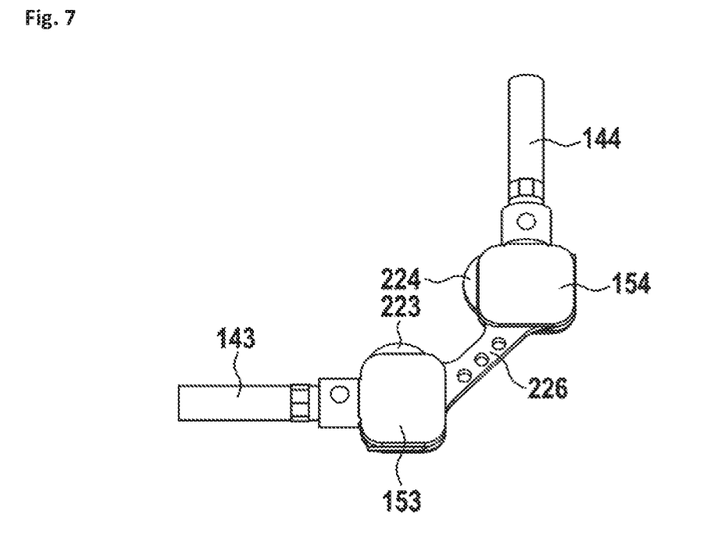
FIG. 7 shows details of connected rotatable pads.

In FIG. 7, details of connected rotatable pads are shown. The pads are connected by a second rotatable pad bridge 226, which may have some holes for fixing the bridge 226 to the second bridge holder 213.

Figure 8:
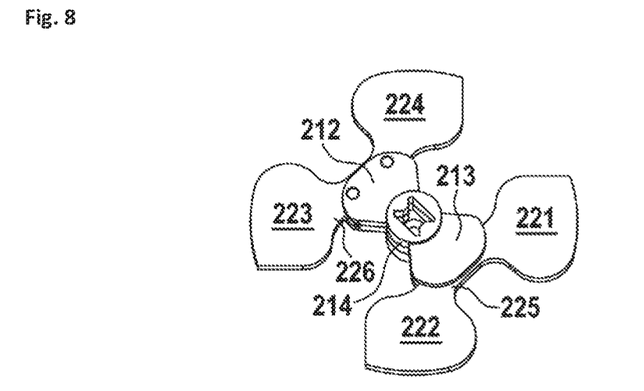
FIG. 8 shows further details of connected rotatable pads.

In FIG. 8, further details of connected rotatable pads are shown.

Figure 9:
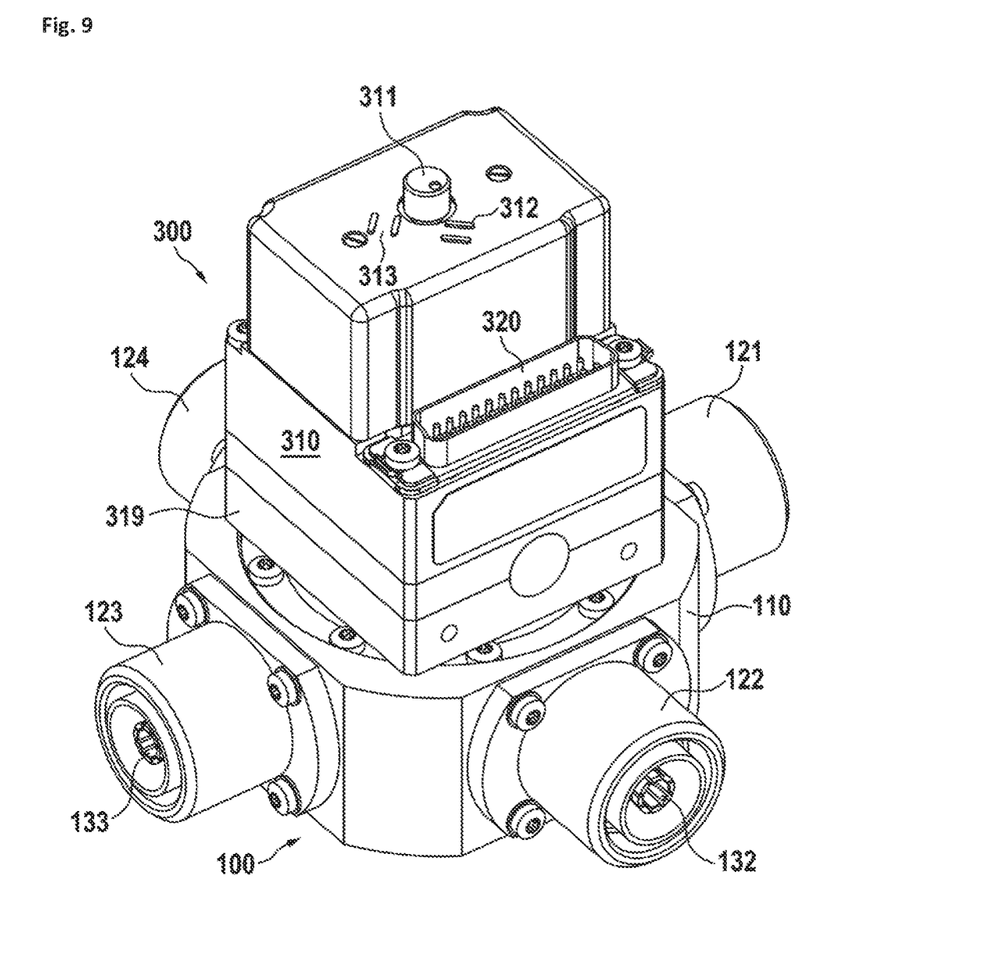
FIG. 9 shows a full assembly of a preferred embodiment.

In FIG. 9, a full assembly of a preferred embodiment is shown. In addition to the previously shown switch components, a drive unit 300 is mounted to the top of the switch. It comprises of a motor housing 310, which preferably has a position indicator 311, showing the basic position of the switch, which is either at a first position mark 312 or at a second position mark 313. There may be a bottom shell 319 which is further mounted to the switch housing and a drive control connector 320 which may provide drive control and position feedback signals to and from the drive unit.

Figure 10:
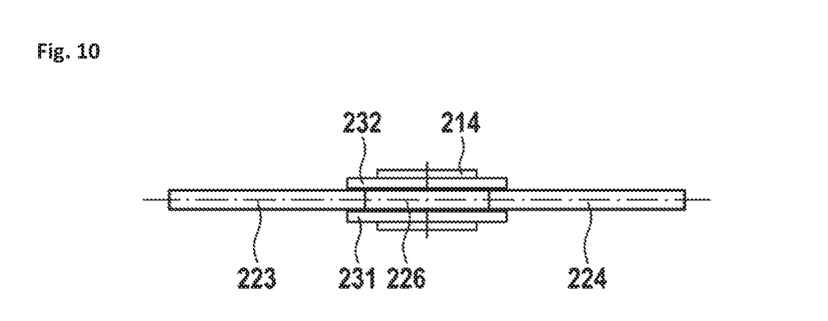
FIG. 10 shows an embodiment with tiltable pads.

In FIG. 10, an embodiment with tiltable pads is shown. A bridge holder comprises a top section 232 and a bottom section 231, preferably further connected to the drive shaft receptacle 214. Both sections hold pad bridge 226 which further holds and connects the third pad 223 and fourth pad 224. The gap between the top section and bottom section is larger than the thickness of the pad bridge, such that the pad bridge may be displaced and/or tilted.

Figure 11:
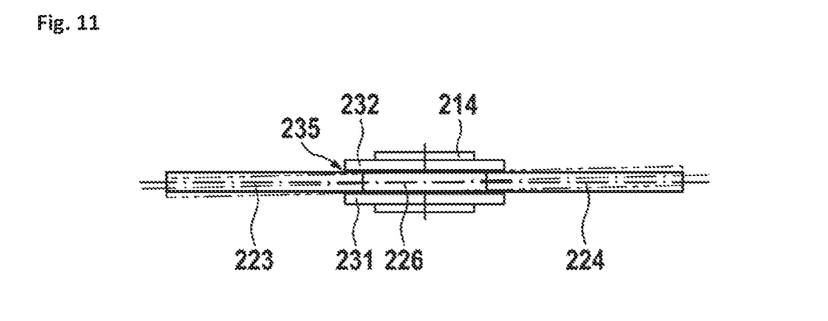
FIG. 11 shows an embodiment with tilted pads.

FIG. 11 shows the same embodiment as above in a tilted state (dashed lines). There may be elastic spacers 235 between the top section and the pad bridge as well as between the pad bridge and the bottom section. Preferably, the displacement and/or tilt angle are limited. A preferred range of displacement is in a range between 0.05 mm and 0.5 mm, most preferably 0.15 mm in either direction. A preferred angle of tilt is in a range between 0.5° and 5°, most preferably 1.5°.

Figure 12:
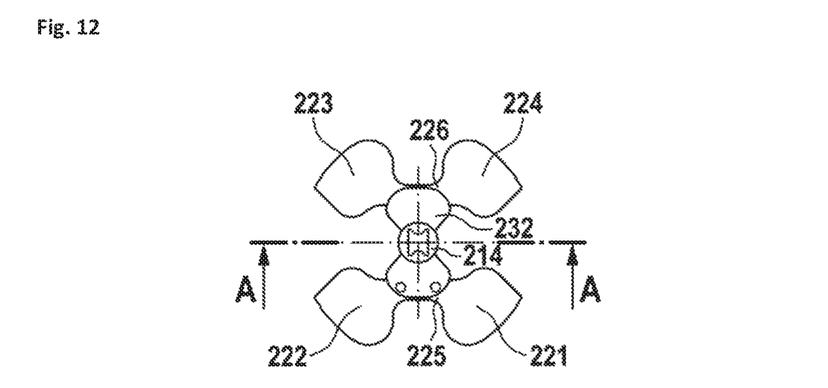
FIG. 12 shows an embodiment with tiltable pads in a top view.

In FIG. 12 a reference drawing is shown. Its indicated section A-A is shown in FIGS. 10 and 11.

Figure 13:
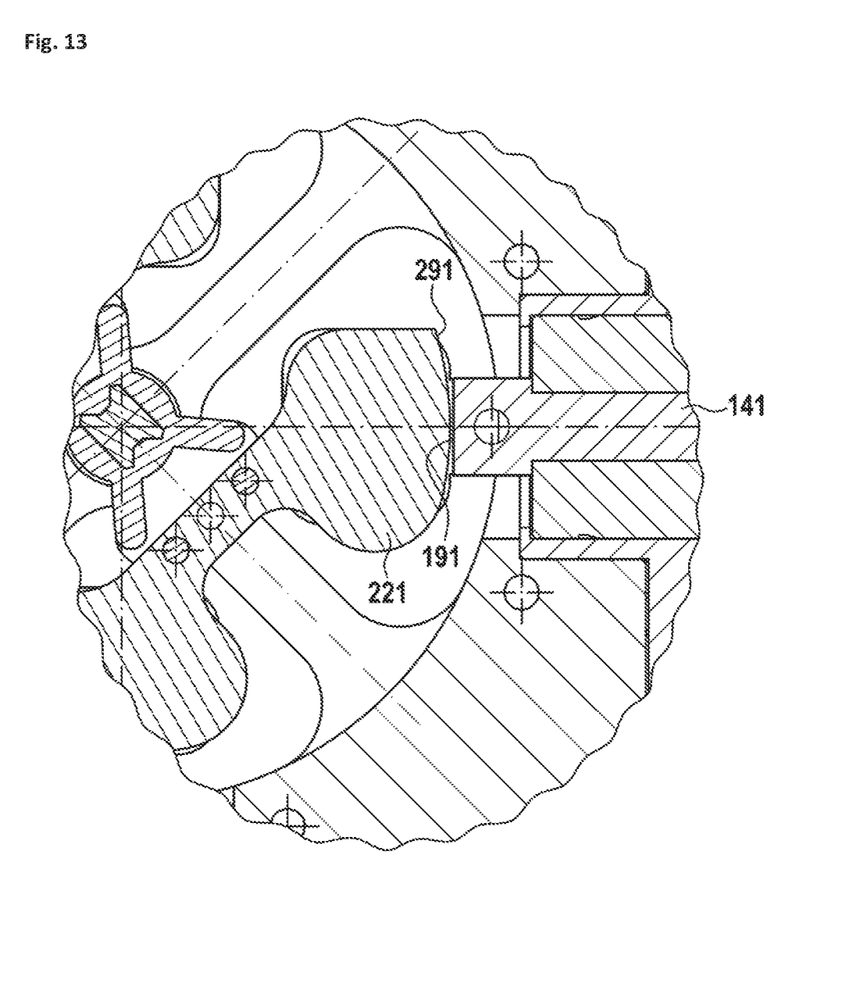
FIG. 13 shows a section of the pads.

In FIG. 13, a section of the pads is shown. Movable pad 221 has an arc shaped outer contour 291 matching to the inner contour 191 (which may be straight or arc shaped) of stationary pad 191. Preferably, there is only a small gap between the movable pad and the stationary pad which results in an increased coupling capacitance. Almost hidden from view below the movable pad 221 is the stationary pad 161.

It will be appreciated to those skilled in the art having the benefit of this disclosure that this invention is believed to provide a low PIM switch. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 rotary switch
110 housing
111 first ridge
112 second ridge
113 third ridge
114 fourth ridge
118 recess
119 threaded hole
121 first coaxial connector
122 second coaxial connector
123 third coaxial connector
124 fourth coaxial connector
131 first coaxial connector center conductor
132 second coaxial connector center conductor
133 third coaxial connector center conductor
134 fourth coaxial connector center conductor
141 first center conductor
142 second center conductor
143 third center conductor
144 fourth center conductor
151 first primary stationary pad section
152 second primary stationary pad section
153 third primary stationary pad section
154 fourth primary stationary pad section
161 first secondary stationary pad section
162 second secondary stationary pad section
163 third secondary stationary pad section
164 fourth secondary stationary pad section
171 first insulator
172 second insulator
173 second insulator
174 second insulator
191 arc shaped inner contour
211 drive shaft
212 first bridge holder
213 second bridge holder
214 drive shaft receptacle
215 first bearing
216 second bearing
217 drive lever
218 rotation of drive shaft
219 rotation, center axis
221 first rotatable pad
222 second rotatable pad
223 third rotatable pad
224 fourth rotatable pad
225 first rotatable pad bridge
226 second rotatable pad bridge
231 bridge holder top section
232 bridge holder bottom section
235 spacers
291 arc shaped outer contour
300 drive unit
310 motor housing
311 position indicator
312 first position mark
313 second position mark
319 bottom shell
320 drive control connector

The invention claimed is:

1. A low passive intermodulation (PIM) RF switch comprising:
a first center conductor connected to at least one first stationary pad,
a second center conductor connected to at least one second stationary pad,
at least one first movable pad and at least one second movable pad electrically and mechanically connected together by a first movable pad bridge, which is further connected mechanically to a drive means configured to move about a center axis,
wherein, in a first coupling state,
the at least one first stationary pad is in close proximity to the at least one first movable pad and the at least one second stationary pad is in close proximity to the at least one second movable pad, to cause a capacitive coupling between the at least one first stationary pad and the at least one first movable pad and between the at least one second stationary pad and the at least one second movable pad to form an RF signal connection between the first center conductor and the second center conductor via respectively-corresponding stationary and movable pads,
wherein the switch is configured to prevent a galvanic contact between said first and second stationary and first and second movable pads by any of (i) having said first and second stationary and first and second movable pads coated with a non-contacting paint; (ii) having said first and second stationary and first and second movable pads carry an anodized isolating layer; and (iii) having said first and second stationary and first and second movable pads separated from one another with a plastic material;
and
wherein at least one of the first and second movable pads is configured to be repositioned by at least one of (i) a displacement parallel to a plane defined by such pad, and (ii) a tilt with respect to a plane defined by such pad.

2. The low PIM RF switch according to claim 1, comprising:
a third center conductor connected to at least one third stationary pad,
a fourth center conductor connected to at least one fourth stationary pad,
at least one third movable pad and at least one fourth movable pad electrically and mechanically connected together by a second movable pad bridge, which is further connected mechanically to the drive means configured to move about the center axis,
wherein the at least one third stationary pad is in close proximity to the at least one third movable pad and the at least one fourth stationary pad is in close proximity to the at least one fourth movable pad, to cause a capacitive coupling between the at least one third stationary pad and the at least one third movable pad and between the at least one fourth stationary pad and the at least one fourth movable pad, to form an RF signal connection between the third center conductor and the fourth center conductor via respectfully-corresponding third and fourth stationary and movable pads, wherein the switch is configured to avoid a galvanic contact between the at least one third moveable and stationary pads and the at least one fourth movable and stationary pads by any of: (i) having said at least one third moveable and stationary pads and the at least one fourth movable and stationary pads coated with a non-contacting paint; (ii) having said at least one third moveable and stationary pads and the at least one fourth movable and stationary pads carry an anodized isolating layer; and (iii) having said at least one third moveable and stationary pads and the at least one fourth movable and stationary pads separated from one another with a plastic material.

3. The low PIM RF switch according to claim 2, wherein in a second coupling state, the at least one second stationary pad is in close proximity to the at least one first movable pad and the at least one third stationary pad is in close proximity to the at least one second movable pad, to cause a capacitive coupling between the at least one second stationary pad and the at least one first movable pad and between the at least one third stationary pad and the at least one second movable pad, to form an RF signal connection between the second center conductor and the third center conductor via respectively-corresponding stationary and movable pads, the at least one fourth stationary pad is in close proximity to the at least one third movable pad and the first stationary pad is in close proximity to the at least one fourth movable pad, to cause a capacitive coupling between the at least one fourth stationary pad and the at least one third movable pad and between the at least one first stationary pad and the at least one fourth movable pad, to form an RF signal connection between the fourth center conductor and the first center conductor via respectively-corresponding stationary and movable pads.

4. The low PIM RF switch according to claim 1, wherein the at least one first movable pad and the at least one second movable pad are configured to rotate about the center axis.

5. The low PIM RF switch according to claim 2, wherein the at least one first movable pad, the at least one second movable pad, the at least one third movable pad, and the at least one fourth movable pad are configured to rotate about the center axis.

6. The low PIM RF switch according to claim 1, wherein at least one of (i) a movable pad; (ii) a stationary pad; (iii) a section of a pad from said movable and stationary pads; and (iv) a pad section is disposed in a plane that is orthogonal to the center axis.

7. The low PIM RF switch according to claim 1, wherein the first movable pad bridge is narrower than either of the at least one first movable pad and the at least one second movable pad.

8. The low PIM RF switch according to claim 2, wherein the second movable pad bridge is narrower than either of the at least one third movable pad and the at least one fourth movable pad.

9. The low PIM RF switch according to claim 1, wherein At least one primary stationary pad section and at least one secondary stationary pad section are connected to at least one center conductor from the first and second center conductors to form a gap dimensioned to accommodate at least one movable pads.

10. The low PIM RF switch according to claim 1, wherein at least two movable pads from the at least one first movable pad and the at least one second movable pad form a gap dimensioned to accommodate at least one stationary pad.

11. The low PIM RF switch according to claim 1, wherein the at least one first movable pad and the at least one second movable pad have arcuate outer contours configured to match inner contours of respectively-corresponding stationary pads.

12. The low PIM RF switch according to claim 1, wherein at least one ridge is provided at a housing between two of stationary pads from the at least one first stationary pad and the at least one second stationary pad.

13. The low PIM RF switch according to claim 1, wherein the drive means includes a drive shaft, and further comprising a drive unit configured to rotate the drive means.

14. The low PIM RF switch according to claim 13, wherein the drive unit includes at least one of a motor, a stepping motor, and a solenoid.

15. The low PIM RF switch according to claim 13, wherein the drive unit includes a position sensor configured to indicate at least one of (i) a region of discrete coupling positions and (ii) which coupling position has been reached.

16. The low PIM RF switch according to claim 13, wherein the drive unit includes a position indicator configured to indicate at least one of (i) individual positions and (ii) a switching state of the switch.

* * * * *